(12) United States Patent
Altin

(10) Patent No.: US 8,732,664 B2
(45) Date of Patent: May 20, 2014

(54) DOCUMENT SERIALIZATION AND COMPARISON VIA OBJECT MODEL

(75) Inventor: Daniel John Altin, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 289 days.

(21) Appl. No.: 13/109,004

(22) Filed: May 17, 2011

(65) Prior Publication Data

US 2012/0297365 A1  Nov. 22, 2012

(51) Int. Cl.
G06F 9/44 (2006.01)

(52) U.S. Cl.
USPC .............................. 717/124; 717/107; 717/153

(58) Field of Classification Search
USPC .................................. 717/107, 120–146, 153
See application file for complete search history.

(56) References Cited

U.S. PATENT DOCUMENTS

| | | | |
|---|---|---|---|
| 6,671,853 B1 | 12/2003 | Burkett et al. | |
| 7,877,399 B2 | 1/2011 | Lwo | |
| 2004/0078784 A1* | 4/2004 | Bates et al. | 717/129 |
| 2005/0108627 A1* | 5/2005 | Mireku | 715/513 |
| 2005/0204298 A1* | 9/2005 | Kemp | 715/762 |
| 2008/0178153 A1* | 7/2008 | Fox et al. | 717/122 |
| 2009/0282389 A1 | 11/2009 | Slone et al. | |
| 2010/0131455 A1 | 5/2010 | Logan et al. | |
| 2010/0191532 A1 | 7/2010 | Rodriguez Serrano et al. | |

OTHER PUBLICATIONS

Hericko et al., Object Serialization Analysis and Comparison in Java and .net, ACM SIGPLAN Notices, vol. 38(8), Aug. 2003, pp. 44-54.*
Callahan et al., Secrets of Java Serialization, 2004 SYS-CON Media, Inc., aquired from http://www2.sys-con.com/ITSG/virtualcd/java/archives/0511/Callahan/index.html[Aug. 28, 2013], pp. 1-5.*
Leblanc et al., Debugging Parallel Programs with Instant Replay, IEEE Transactions on Computers, vol. C-36, No. 4, Apr. 1987, pp. 471-482.*
"C# Compare the Data in Two Object Models", Retrieved at <<http://stackoverflow.com/questions/4616610/c-compare-the-data-in-two-object-models>>, Retrieved Date: Mar. 3, 2011, pp. 4.
"Use Reflection to Compare the Properties of Two Objects", Retrieved at <,http://www.sidesofmarch.com/index.php/archive/2007/08/03/use-reflection-to-compare-the-properties-of-two-objects/>>, Aug. 3, 2007, pp. 5.
"Thread: Serialization Output for Snapshots", Retrieved at <<http://forums.oracle.com/forums/thread.jspa?messageID=4663042>>, Retrieved Date: Mar. 3, 2011, pp. 4.

* cited by examiner

*Primary Examiner* — Satish Rampuria
(74) *Attorney, Agent, or Firm* — Hope Baldauff, LLC

(57) ABSTRACT

Technologies are described herein for serializing in-memory objects of an application program for purposes of comparison. A request to serialize in-memory objects of an application program is received. A list of one or more objects, properties, or methods to be serialized is read from a serialization driver file and the one or more objects, properties, or methods in an object memory of the application program are accessed through an object model exposed by the application program. Values from the one or more objects, properties, or methods in the object memory are serialized and stored in a generic object container that facilitates comparison between the serialized values from the application program and corresponding values from other versions of the application program.

18 Claims, 4 Drawing Sheets

DOCUMENT SERIALIZATION AND COMPARISON VIA OBJECT MODEL

BACKGROUND

A software development team testing two different versions of an application program often needs to compare application documents or in-memory objects manipulated by the application program in order to determine if processing of the documents or objects in a new version of the application is flawed or may have been inadvertently changed. It may be complicated and difficult to compare the application documents as saved to a file, for example, because changes in file format may have occurred between the versions, or the application documents as saved to storage may not have a specific order or form.

There also may not be a method for generically comparing the entire application document or any subsets of objects therein when the application documents are loaded by the program. Therefore, the development team may manually compare a single aspect or a subset of data in the application document related to the software changes that were made between the versions of the application program, instead of comparing the entire document structure while testing. However, other portions or data in the application document outside of the subset tested could potentially differ as a result of the software changes, and these differences may go undetected in the testing of new versions of the software. This may result in new bugs being introduced into the software product.

It is with respect to these considerations and others that the disclosure made herein is presented.

SUMMARY

Technologies are described herein for serializing in-memory objects of an application program for purposes of comparison. Utilizing the technologies presented herein, a software development team may serialize the in-memory application documents or objects maintained by two different versions of an application program in order to detect differences in the objects that may result from differences in application processing between the two versions of the application. The differences between the in-memory objects of the two versions of the application program may further be logged in order to aid software developers in identifying and fixing potential software bugs.

According to embodiments, a request to serialize in-memory objects of an application program is received. A list of one or more objects, properties, or methods to be serialized is read from a serialization driver file and the one or more objects, properties, or methods in an object memory of the application program are accessed through an object model exposed by the application program. Values from the one or more objects, properties, or methods in the object memory are serialized and stored in a generic object container that facilitates comparison between the serialized values from the application program and corresponding values from other versions of the application program.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for serializing in-memory objects of an application program for purposes of comparison. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof and that show, by way of illustration, specific embodiments or examples. In the accompanying drawings, like numerals represent like elements through the several figures.

Figure 1:
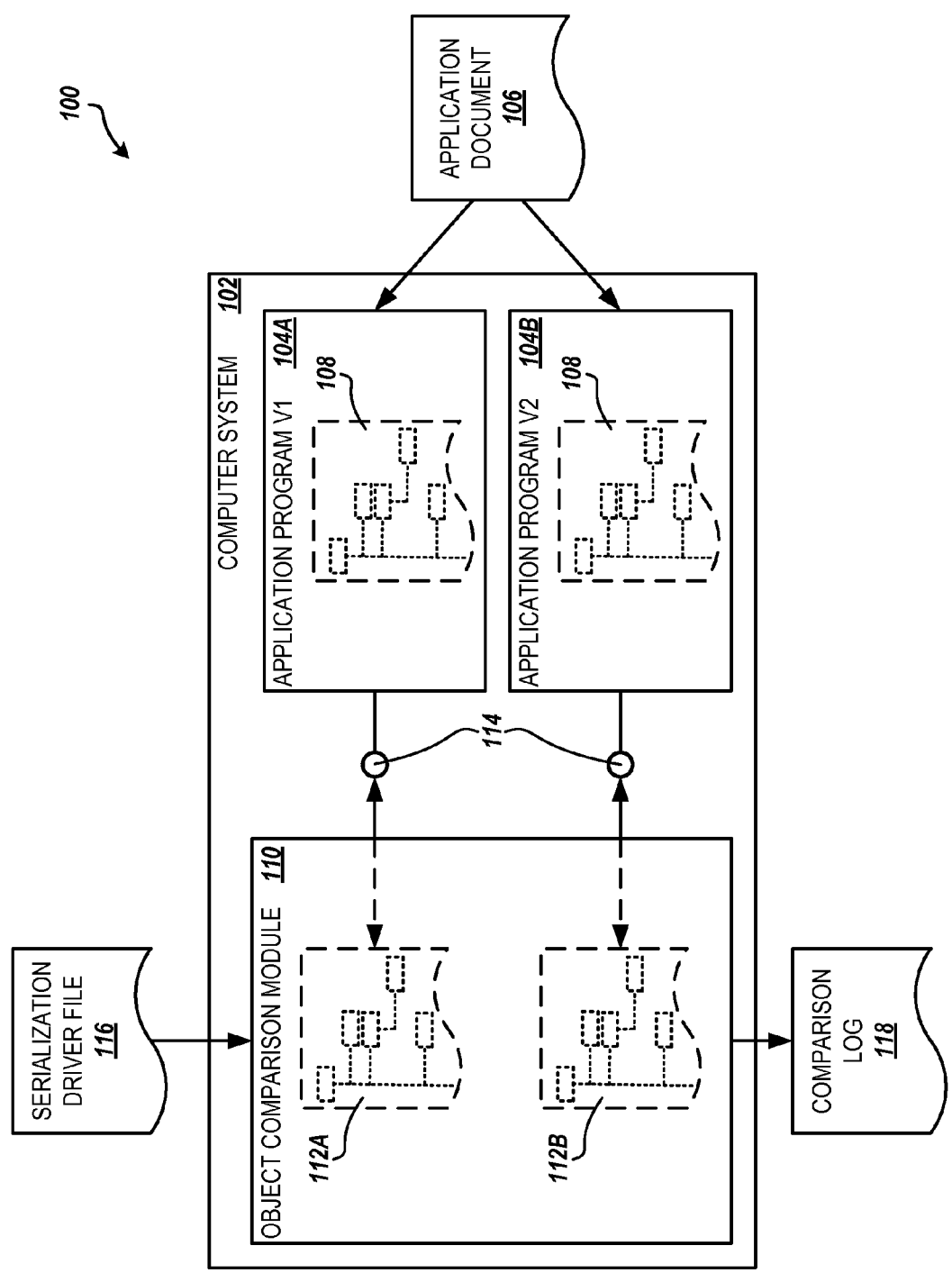
FIG. 1 is a block diagram showing aspects of an illustrative operating environment and several software components provided by the embodiments presented herein.

FIG. 1 shows an illustrative operating environment 100 including several software components for serializing in-memory objects of an application program for purposes of comparison, according to embodiments provided herein. The environment 100 includes a computer system 102. The computer system 102 may represent a user computing device, such as a personal computer ("PC"), a desktop workstation, a laptop, a notebook, a mobile device, a personal digital assistant ("PDA"), and the like. Alternatively, the computer system 102 may represent a user computing device operatively connected to one or more application servers, Web servers, database servers, network appliances, dedicated hardware devices, and/or other server computers or user computing devices known in the art.

According embodiments, the computer system 102 may execute application programs 104A, 104B (referred to herein generally as application programs 104) for the purposes of testing the application software. The application programs 104 may be utilized by users to manipulate and store data in files or application documents. For example, the application programs 104 may include productivity applications, such as the MICROSOFT® POWERPOINT® presentation software, the MICROSOFT® EXCEL® spreadsheet software, the MICROSOFT® WORD word processing software, or the MICROSOFT® VISIO® diagramming software, all from Microsoft Corp. of Redmond, Wash.

According to embodiments, the computer system 102 may concurrently or consecutively execute multiple versions of a particular application program, such application program v1 104A and application program v2 104B. Each version of the application program 104 executing on the computer system 102 may load an application document 106 containing application data. Each application program 104 may further create an object memory 108 containing objects and other application data loaded from the application document 106. The application objects and other data contained in the object memory 108 may be subsequently modified or manipulated by processing within the application program 104. In one embodiment, a software developer or tester may execute the same series of scripted application processing steps in each version of the application program 104 executing on the computer system 102 once the application document 106 is loaded in order to test the processing logic of the application.

An object comparison module 110 also executes on the computer system 102 that provides services to the software developer or tester to compare in-memory objects maintained in each version of the application program 104A and 104B executing on the computer system. The software developer or tester may desire to compare the objects in the object memories 108 after loading the application document 106 and/or executing the series of scripted application processing steps in order to determine if any differences exist in the in-memory objects arising from differences in the processing logic between the versions application programs 104A and 104B. The object comparison module 110 may execute locally on the computer system 102, or may execute on a server computer, such as a Web server, accessed by a client application executing on the computer system 102. The object comparison module 110 may be implemented as hardware, software, or a combination of the two. The object comparison module 110 may be an add-in or component of a software development or testing suite, for example, and may include a number of application program modules and other components on the computer system 102.

According to embodiments, the object comparison module 110 accesses the object memories 108 maintained in each version of the application program 104A and 104B executing on the computer system 102 and serializes application objects and other data contained therein. The serialized application objects and data are stored in generic object containers 112A, 112B (referred to herein generally as generic object containers 112), as will be described in more detail below in regard to FIG. 2. For example, the object comparison module 110 may access the object memory 108 maintained in application program v1 104A to serialize application objects and data contained therein and store them in generic object container 112A, and access the object memory 108 maintained in application program v2 104B to serialize application objects and data contained therein and stored them in generic object container 112B. The object comparison module 110 may then compare the contents of generic object container 112A to generic object container 112B and inform the software developer or tester of any differences between the containers.

In one embodiment, the object comparison module 110 accesses the object memories 108 through an object model 114 or other defined application programming interface ("API") exposed by the application programs 104. For example, in the case of the MICROSOFT® productivity applications described above, the object comparison module 110 may access the application objects and data in the object memories 108 through the Primary Interop Assembly ("PIA") exposed by these applications. The PIA provides access to the application objects maintained in the application programs 104 as well as type definitions and other metadata describing the objects, properties, and methods of the object model 114.

The object comparison module 110 may use reflection to traverse the object hierarchy defined in the object model 114 and access the properties and methods of the application objects and serialize and store the results in the generic object containers 112A and 112B. It will be appreciated that the object comparison module 110 may utilize other object models 114 or APIs known in the art related to other application programs 104 or application suites to access the object memories 108 beyond those described herein. It is intended that this application include all such methods of accessing the application objects and data in the object memories 108 of the application programs 104.

According to another embodiment, the serialization of the application objects and data maintained in the object memories 108 of the application programs 104 by the object comparison module 110 is driven by a serialization driver file 116. The serialization driver file 116 may be an XML file or other declarative format document that describes which objects, properties, and methods of the object model 114 exposed by the application programs 104 are to be serialized and stored in the generic object containers 112. This allows software developers or testers to target the comparison process to a subset of the application objects and data maintained in the object memories. This may also allow the exclusion of objects, properties, or methods from the comparison process when it is known that these items are defined differently or inconsistently between the versions of the application program 104 being tested. The serialization driver file 116 may also drive the comparison process of the generic object containers 112 containing the serialized object data, as will be described in more detail below.

TABLE 1

XML snippet from serialization driver file

<ComparisonType type='PowerPoint.PresentationClass'>
   <Property name='SectionProperties' type=
   '.PowerPoint.SectionProperties' />
   <List name='Slides' type='PowerPoint.SlideClass' />
</ComparisonType>

Table 1 provides an example XML snippet from an illustrative serialization driver file 116. In this example, the ComparisonType element may define a specific type of object in the object model 114 that the object comparison module 110 is to serialize and/or compare. The type attribute ComparisonType element may specify the fully-namespace-resolved type name from the object model 114, such as the 'PowerPoint.PresentationClass' shown in Table 1. The Property element may define a property that exists under the 'PowerPoint.PresentationClass' object that is also to be serialized and compared, such as the 'SectionProperties' property, along with a specification of the type 'PowerPoint.SectionProperties' that the property will return. Similarly, the List element further shown in Table 1 may define a collection of items in the PowerPoint.PresentationClass' object that is to be serialized and compared. The List element in the serialization driver file 116 may signal the object comparison module 110 to iterate over the collection of items to serialize and store each separately.

In another embodiment, the serialization driver file 116 may contain further information that affects the comparison process. For example, for a particular property defined in a Property element of the serialization driver file 116, a tolerance attribute may be specified that defines a range for comparison of the values of the property within which the property values may be considered the same. In a further embodiment, the object comparison module 110 or another module or component may provide for the serialization driver file 116 to be initially generated from the object model 114 of the application program 104, containing all the objects, properties, and methods defined therein, and then allow the driver file to be tweaked and adjusted by the software developers and or testers based on knowledge of the differences between the versions of the application programs being tested and other testing needs.

According to another embodiment, as the object comparison module 110 performs the comparison process between the generic object containers 112A and 112B generated from the object memories 108 of the respective versions of the application program 104A and 104B executing on the computer system 102, the object comparison module 110 logs the differences encountered between object containers in a comparison log 118. The comparison log 118 may contain identifiers of the objects, properties, and methods in the object model 114 exhibiting differences between the different versions of the application program 104, as well as the actual property values or method data returned for the respective versions. The comparison log 118 may provide the software developers or testers with information required to identify and correct software bugs introduced into new versions of the application program 104.

Figure 2:
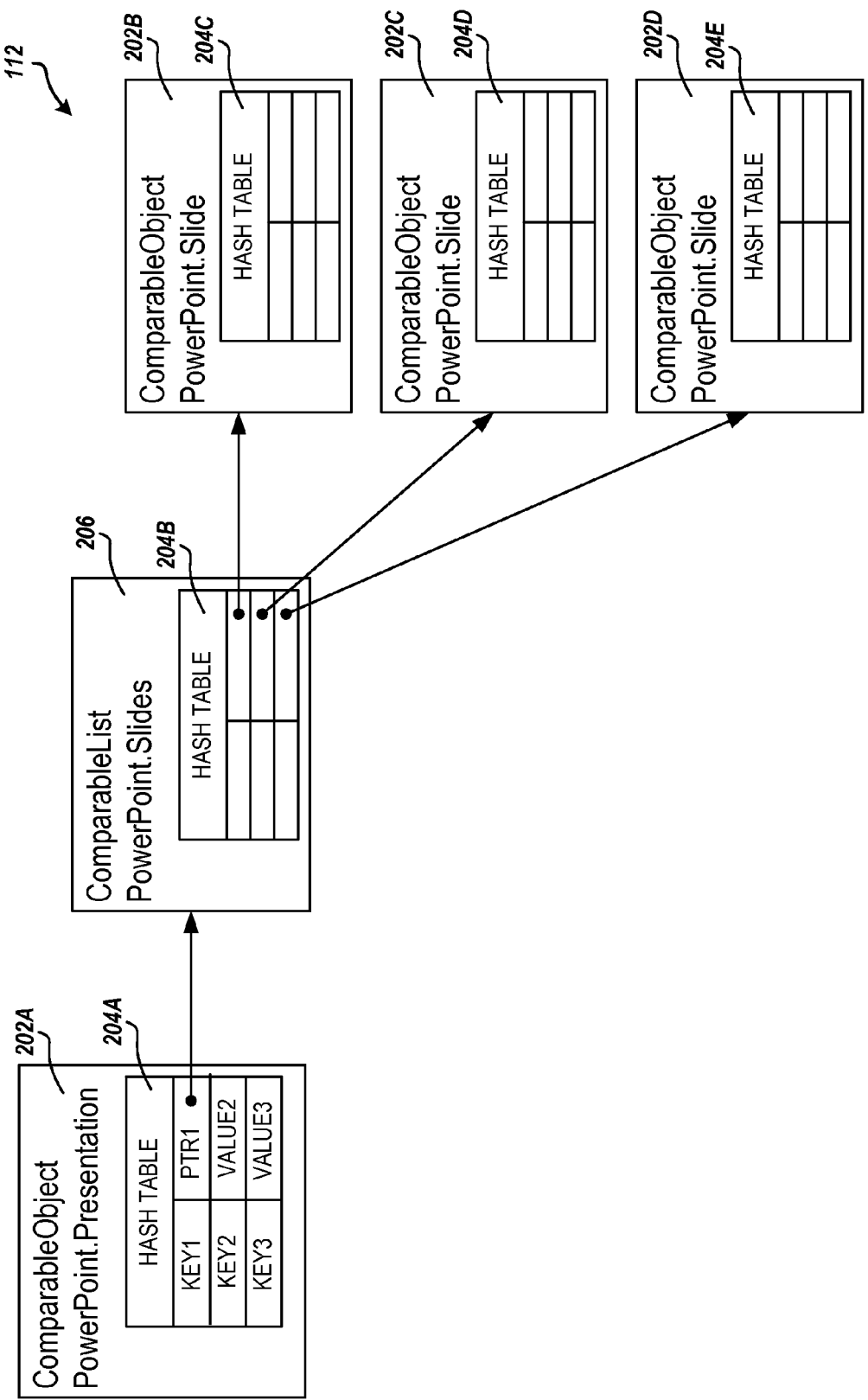
FIG. 2 is a block diagram illustrating details of a generic object container containing serialized data from the in-memory objects of the application program for comparison, according to embodiments described herein.

FIG. 2 shows further details of a generic object container 112 generated by the object comparison module 110 from the serialization from the object memory 108 of the application program 104. According to one embodiment, the generic object containers 112 contain specialized objects that store the serialized data as well as facilitate the comparison process for the object comparison module 110. For example, for each object serialized through the object model 114 from the object memory 108, the object comparison module 110 may create a ComparableObject object 202A-202D (referred to herein generally as ComparableObject object 202) in the generic object container 112. Each ComparableObject object 202 may contain a name attribute, for example, that specifies the type name of the corresponding object retrieved through object model 114, such as 'PowerPoint.Presenetation' shown for ComparableObject 202A shown in FIG. 2.

Each ComparableObject object 202 may further contain a hash table 204A-204E (referred to herein generally as hash table 204) that contains key-value pairs containing the serialized data from the properties and/or methods of the object being serialized. As described above, the object comparison module 110 may iterate through the properties and methods of a particular object exposed by the object model 114 and use reflection to invoke each of them. According to one embodiment, the objects, properties, and methods accessed by the object comparison module 110 is driven by the serialization driver file 116, as described above.

If the reflection call returns a primitive, such as an integer, string, enum, boolean, or the like, then the object comparison module 110 may save the primitive result into an entry in the hash table, with the key corresponding to the property or method name, and the value containing to the returned primitive. If the reflection call returns another object, the object comparison module 110 may create a new ComparableObject object 202 to contain the object data and store a pointer to the new ComparableObject in the hash table of the parent ComparableObject object. If the reflection call returns a collection of items, such as a 'PowerPoint.Slides' type shown in FIG. 2, the object comparison module 110 may create a ComparableList object 206 containing a hash table 204B containing pointers to a ComparableObject object 202B-202D for each item, such as the 'PowerPoint.Slide' item, in the collection. The result is a hierarchy of ComparableObject objects 202 and ComparableList objects 206 that represent a serialized version of top level object 'PowerPoint.Presentation' from the object memory 108 as accessed by the object comparison module 110 through the object model 114.

Figure 3:
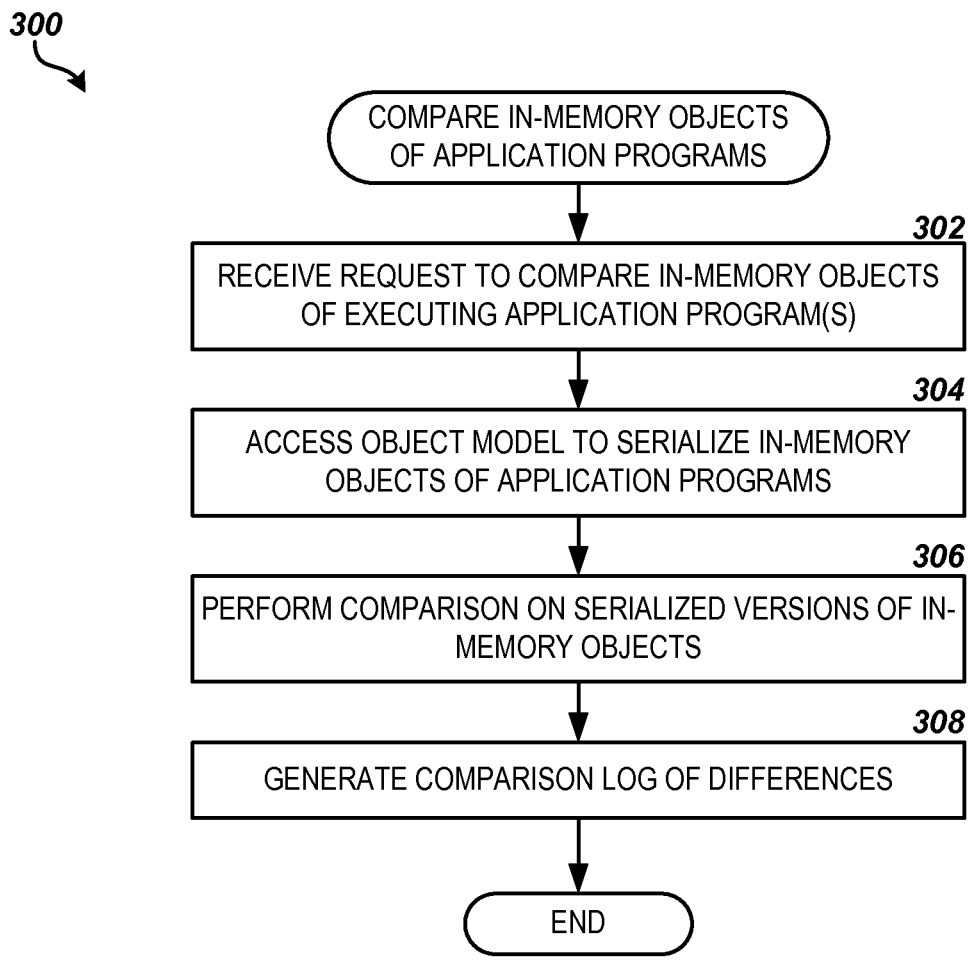
FIG. 3 is a flow diagram showing methods for serializing in-memory objects of an application program for purposes of comparison, according to embodiments described herein.

Referring now to FIG. 3, additional details will be provided regarding the embodiments presented herein. It should be appreciated that the logical operations described with respect to FIG. 3 are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. The operations may also be performed in a different order than described.

FIG. 3 illustrates one routine 300 for serializing in-memory objects of two versions of an application program 104A and 104B executing on the computer system 102 in order to compare the in-memory objects to detect potential processing differences between the versions. According to one embodiment, the routine 300 may be performed by the object comparison module 110 executing on the computer system 102 and/or other servers or computing devices. It will be appreciated that the routine 300 may also be performed by other modules or components executing on other computing devices, or by any combination of modules, components, and computing devices.

The routine 300 begins at operation 302, where the object comparison module 110 receives a request to compare the in-memory objects of two executing application programs 104A and 104B on the computer system 102. The application programs 104A and 104B may be executing concurrently, or they may be executed at different times with individual requests to serialize the in-memory objects of each instance of the application program received by the object comparison module 110 separately. The executing application programs 104A and 104B may be specified to the object comparison module 110 by application handle, process ID, application image name, or some other mechanism known in the art. According to one embodiment, the application programs 104A and 104B may have both loaded the same application document 106 into the object memories 108. In addition, a software developer, tester, or automated testing software may have executed the same series of scripted application processing steps in each version of the application program 104A and 104B, thus modifying the respective object memories 108 from their initially loaded state. In a further embodiment, the request may include a specification of a serialization driver file 116 to drive the serialization and comparison process.

From operation 302, the routine 300 proceeds to operation 304, where the object comparison module 110 accesses the object model 114 exposed by the application programs 104A and 104B to serialize application objects in the object memories 108 of each version of the application program executing on the computer system 102. The object comparison module 110 may use reflection to traverse the object hierarchy defined in the object model 114 and access the properties and methods of the objects and serialize and store the results in the generic object containers 112A and 112B, respectively. According to one embodiment, the object comparison module 110 may read the serialization driver file 116 specified in the request to determine which objects, properties, and methods of the object model 114 exposed by the application programs 104A and 104B to serialize and store in the generic object containers 112A and 112B.

The routine 300 then proceeds from operation 304 to operation 306, where the object comparison module 110 compares the two generic object containers 112A and 112B created from the object memories 108 of application programs 104A and 104B, respectively. In one embodiment, the comparison process is facilitated by the specialized objects created in the generic object containers 112 that store the serialized data from the object memories 108. For example, the object comparison module 110 may perform a simple comparison of the top level ComparableObject objects 202A in the generic object containers 112A and 112B. The ComparableObject class may overload the comparison operator to implement a comparison process that traverses the hierarchies of ComparableObject objects 202 and ComparableList objects 206 stored in the generic object containers 112A and 112B in order to perform a one-to-one comparison of all corresponding property and method values stored in the hash tables 204.

According to another embodiment, the comparison process may be further driven by the serialization driver file 116. For example, for a particular property defined in a Property element of the serialization driver file 116, a tolerance attribute may be specified that defines a range for comparison of the values of the property within which the property values may be considered the same. The object comparison module 110 may utilize any tolerance attributes specified for the properties and/or methods specified in the serialization driver file 116 to perform the comparisons and determine if differences exist.

From operation 306, the routine 300 proceeds to operation 308, where the object comparison module 110 generates the comparison log 118 listing all differences found between the in-memory objects of the executing application programs 104 and 104B, as described above in regard to FIG. 1. The comparison log 118 may contain identifiers of the objects, properties, and methods in the object model 114 exhibiting differences between the different versions of the application programs 104, as well as the actual property values or method data returned for the respective versions. The comparison log 118 may provide the software developers or testers with information required to identify and correct software bugs introduced into new versions of the application program 104. From operation 308, the routine 300 ends.

Figure 4:
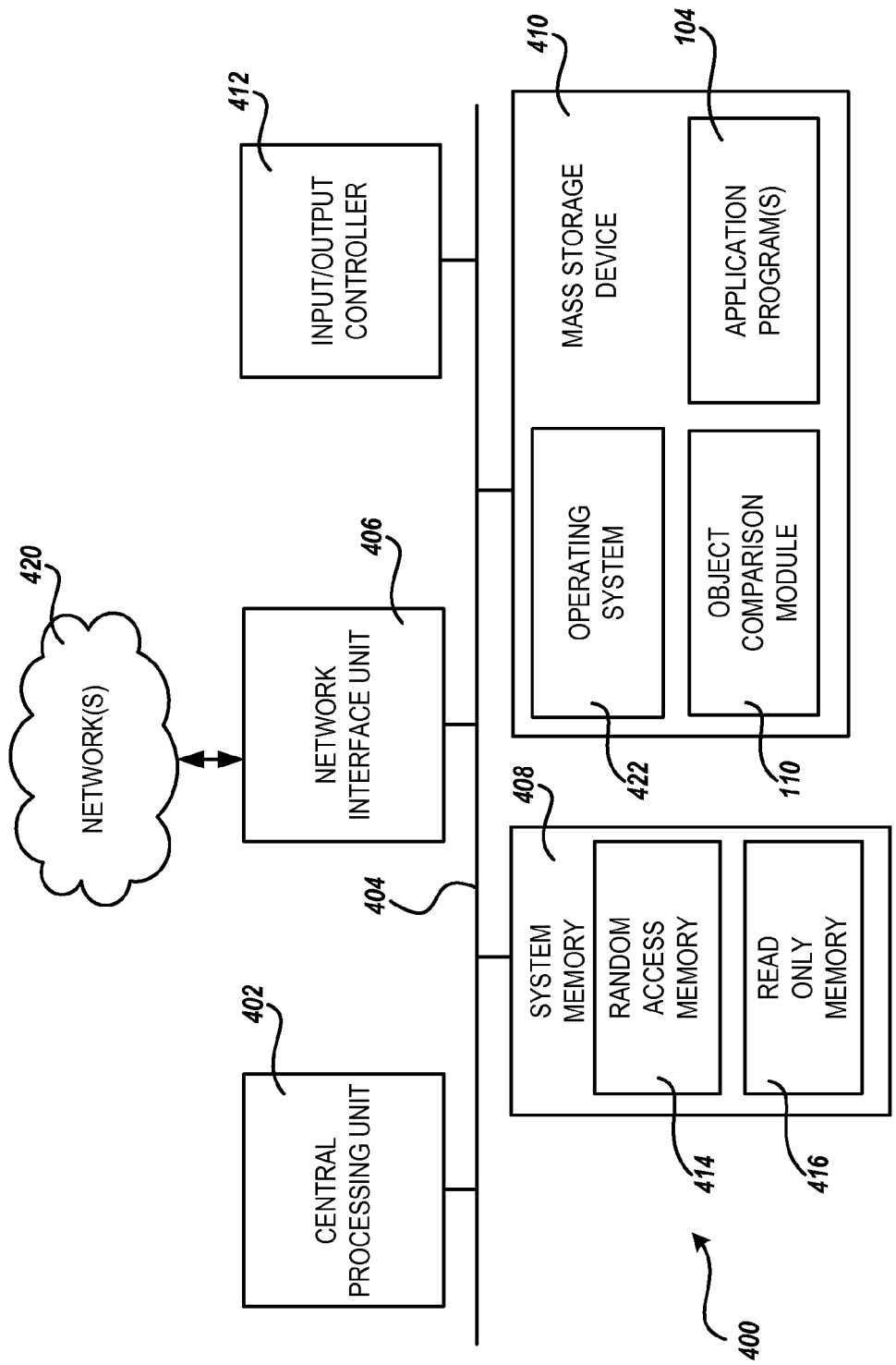
FIG. 4 is a block diagram showing an illustrative computer hardware and software architecture for a computing system capable of implementing aspects of the embodiments presented herein.

FIG. 4 shows an example computer architecture for a computer 400 capable of executing the software components described herein for serializing in-memory objects of an application program for purposes of comparison, in the manner presented above. The computer architecture shown in FIG. 4 illustrates a conventional server computer, desktop computer, laptop, notebook, PDA, wireless phone, or other computing device, and may be utilized to execute any aspects of the software components presented herein described as executing on the computer system 102 or other computing device.

The computer architecture shown in FIG. 4 includes one or more central processing units ("CPUs") 402. The CPUs 402 may be standard processors that perform the arithmetic and logical operations necessary for the operation of the computer 400. The CPUs 402 perform the necessary operations by transitioning from one discrete, physical state to the next through the manipulation of switching elements that differentiating between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and other logic elements.

The computer architecture further includes a system memory 408, including a random access memory ("RAM") 414 and a read-only memory 416 ("ROM"), and a system bus 404 that couples the memory to the CPUs 402. A basic input/output system containing the basic routines that help to transfer information between elements within the computer 400, such as during startup, is stored in the ROM 416. The computer 400 also includes a mass storage device 410 for storing an operating system 422, application programs, and other program modules, which are described in greater detail herein.

The mass storage device 410 is connected to the CPUs 402 through a mass storage controller (not shown) connected to the bus 404. The mass storage device 410 provides non-volatile storage for the computer 400. The computer 400 may store information on the mass storage device 410 by transforming the physical state of the device to reflect the information being stored. The specific transformation of physical state may depend on various factors, in different implementations of this description. Examples of such factors may include, but are not limited to, the technology used to implement the mass storage device, whether the mass storage device is characterized as primary or secondary storage, and the like.

For example, the computer 400 may store information to the mass storage device 410 by issuing instructions to the mass storage controller to alter the magnetic characteristics of a particular location within a magnetic disk drive, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description. The computer 400 may further read information from the mass storage device 410 by detecting the physical states or characteristics of one or more particular locations within the mass storage device.

As mentioned briefly above, a number of program modules and data files may be stored in the mass storage device 410 and RAM 414 of the computer 400, including an operating system 418 suitable for controlling the operation of a computer. The mass storage device 410 and RAM 414 may also store one or more program modules. In particular, the mass storage device 410 and the RAM 414 may store the object comparison module 110 or the application program(s) 104, both of which were described in detail above in regard to FIG. 1. The mass storage device 410 and the RAM 414 may also store other types of program modules or data.

In addition to the mass storage device 410 described above, the computer 400 may have access to other computer-readable media to store and retrieve information, such as program modules, data structures, or other data. It should be appreciated by those skilled in the art that computer-readable media may be any available media that can be accessed by the computer 400, including computer-readable storage media and communications media. Communications media includes transitory signals. Computer-readable storage media includes volatile and non-volatile, removable and non-removable media implemented in any method or technology for the storage of information, such as computer-readable instructions, data structures, program modules, or other data. For example, computer-readable storage media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and that can be accessed by the computer 400.

The computer-readable storage medium may be encoded with computer-executable instructions that, when loaded into the computer 400, may transform the computer system from a general-purpose computing system into a special-purpose computer capable of implementing the embodiments described herein. The computer-executable instructions may be encoded on the computer-readable storage medium by altering the electrical, optical, magnetic, or other physical characteristics of particular locations within the media. These computer-executable instructions transform the computer 400 by specifying how the CPUs 402 transition between states, as described above. According to one embodiment, the computer 400 may have access to computer-readable storage media storing computer-executable instructions that, when executed by the computer, perform the routine 300 for serializing in-memory objects of an application program for purposes of comparison, described above in regard to FIG. 3.

According to various embodiments, the computer 400 may operate in a networked environment using logical connections to remote computing devices and computer systems through a network 420, such as a LAN, a WAN, the Internet, or a network of any topology known in the art. The computer 400 may connect to the network 420 through a network interface unit 406 connected to the bus 404. It should be appreciated that the network interface unit 406 may also be utilized to connect to other types of networks and remote computer systems.

The computer 400 may also include an input/output controller 412 for receiving and processing input from a number of input devices, including a keyboard, a mouse, a touchpad, a touch screen, an electronic stylus, or other type of input device. Similarly, the input/output controller 412 may provide output to a display device, such as a computer monitor, a flat-panel display, a digital projector, a printer, a plotter, or other type of output device. It will be appreciated that the computer 400 may not include all of the components shown in FIG. 4, may include other components that are not explicitly shown in FIG. 4, or may utilize an architecture completely different than that shown in FIG. 4.

Based on the foregoing, it should be appreciated that technologies for serializing in-memory objects of an application program for purposes of comparison are provided herein. Although the subject matter presented herein has been described in language specific to computer structural features, methodological acts, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for comparing in-memory objects of application programs, the method comprising executing instructions in a computer system to perform the operations of:
   receiving a request to serialize the in-memory objects of the application programs, the request further specifying a serialization driver file;
   reading a list of one or more objects, properties, or methods to be serialized from the serialization driver file;
   accessing the one or more objects, properties, or methods from an object memory of the application programs through an object model exposed by the application program;
   serializing object data for one or more objects in the first object memory and storing the serialized object data in a first generic object container, wherein the first generic object container is configured to facilitate comparison of serialized object data from the objects, properties, or methods of the object memories of a plurality of application programs;
   accessing the one or more objects, properties, or methods from a second object memory of the application programs through the object model;
   serializing object data from the one or more objects, properties, or methods in the second object memory and storing the serialized object data in a second generic object container;
   comparing the serialized object data from the one or more objects, properties, or methods stored in the first generic object container to the serialized object data stored in the second generic object container; and
   generating a comparison log comprising a list of differences between the serialized object data in the first generic object container and the second generic object container.

2. The computer-implemented method of claim 1, wherein the serialization driver file comprises an XML file specifying one or more objects, properties, or methods exposed by the object model to be serialized and stored in the first generic object container and the second generic object container.

3. The computer-implemented method of claim 2, wherein the serialization driver file further comprises XML specifying a tolerance attribute associated with one of the one or more properties, the tolerance attribute specifying a range within which two property values may be considered the same.

4. The computer-implemented method of claim 1, wherein the first generic object container and second generic object container comprise a hierarchy of objects containing the serialized object data and wherein the objects in the hierarchy of objects facilitate the comparison between the serialized object data stored in the first generic object container and the second generic object container.

5. The computer-implemented method of claim 4, wherein each object in the hierarchy of objects comprises a hash table for storing a portion of the serialized object data.

6. The computer-implemented method of claim 1, wherein a same application document is loaded into the first of the application programs before serializing the serialized object data stored in the first generic object container and the second of the application programs before serializing the serialized object data stored in the second generic object container.

7. The computer-implemented method of claim 1, wherein a same series of processing steps is executed in the first of the application programs and the second of the application programs before serializing the object data.

8. The computer-implemented method of claim 1, wherein the first of the application programs and the second of the application programs comprise different versions of a same application program.

9. A computer-readable storage medium, that is not a signal, encoded with computer-executable instructions that, when executed by a computer, cause the computer to:
receive a request to serialize in-memory objects of an application program, the request further specifying a serialization driver file;
read a list of one or more objects, properties, or methods to be serialized from the serialization driver file;
access the one or more objects, properties, or methods from an object memory of the application program through an object model exposed by the application program;
serialize values from the one or more objects, properties, or methods from the object memory and store the serialized values in a first generic object container, wherein the first generic object container is configured to facilitate comparison of serialized values from the objects, properties, or methods of the object memories of a plurality of application programs;
access the one or more objects, properties, or methods from a second object memory of a second application program through the object model;
serialize values from the one or more objects, properties, or methods from the second object memory and store the serialized values in a second generic object container;
compare the serialized values from the one or more objects, properties, or methods stored in the second generic object container to corresponding serialized values stored in the first generic object container; and
generate a comparison log comprising a list of differences in the serialized values between the second generic object container and the first generic object container.

10. The computer-readable storage medium of claim 9, wherein the serialization driver file comprises an XML file specifying XML elements corresponding to each of the one or more objects, properties, or methods to be serialized.

11. The computer-readable storage medium of claim 10, wherein the serialization driver file further comprises XML specifying a tolerance attribute associated with a property of the one or more objects, properties, or methods, the tolerance attribute specifying a range within which two serialized values for the property may be considered the same.

12. The computer-readable storage medium of claim 9, wherein the first generic object container comprises a hierarchy of objects containing the serialized values from the one or more objects, properties, or methods from the object memory.

13. The computer-readable storage medium of claim 12, wherein each object in the hierarchy of objects comprises a hash table for storing the serialized values.

14. A system for comparing in-memory objects of application programs, the system comprising:
one or more processors; and
a memory coupled to the one or more processors and containing an object comparison module configured to
receive a request to serialize in-memory objects of an application program, the request further specifying a serialization driver file;
read a list of one or more objects, properties, or methods to be serialized from a serialization driver file,
access the one or more objects, properties, or methods from an object memory of the application program through an object model exposed by the application program;
serialize values from the one or more objects, properties, or methods from an object memory and store the serialized values in a first generic object container,
serialize values for the one or more objects, properties, or methods from the object memory of a second of the application programs and store the serialized values in a second generic object container, wherein the first generic object container is configured to facilitate comparison of serialized values from the objects, properties, or methods of the object memories of a plurality of application programs,
access the one or more objects, properties, or methods from a second object memory of a second application program through the object model;
serialize values from the one or more objects, properties, or methods from the second object memory and store the serialized values in a second generic object container;
compare the serialized values from of the one or more objects, properties, or methods stored in the first generic object container to corresponding serialized values stored in the second generic object container, and
generate a comparison log comprising a list of differences in the serialized values between the first generic object container and the second generic object container.

15. The system of claim 14, wherein the one or more objects, properties, or methods of the object memories of the application programs are accessed through a same object model exposed by the application programs.

16. The system of claim 15, wherein the serialization driver file comprises an XML file specifying the one or more of the objects, properties, or methods exposed by the object model.

17. The system of claim 14, wherein the first generic object container and second generic object container comprise a hierarchy of objects containing the serialized values in hash tables, and wherein the objects in the hierarchy of objects facilitate the comparison between the serialized values stored in the first generic object container and the corresponding serialized values stored in the second generic object container.

18. The system of claim 14, wherein the first of the application programs and the second of the application programs comprise different versions of a same application program.

* * * * *